US008352730B2

(12) United States Patent
Giobbi (10) Patent No.: US 8,352,730 B2
(45) Date of Patent: Jan. 8, 2013

(54) BIOMETRIC PERSONAL DATA KEY (PDK) AUTHENTICATION

(75) Inventor: John J. Giobbi, Bend, OR (US)

(73) Assignee: Proxense, LLC, Bend, OR (US)

( * ) Notice: Subject to any disclaimer, the term of this patent is extended or adjusted under 35 U.S.C. 154(b) by 938 days.

(21) Appl. No.: 11/314,199

(22) Filed: Dec. 20, 2005

(65) Prior Publication Data

US 2006/0143441 A1    Jun. 29, 2006

Related U.S. Application Data

(60) Provisional application No. 60/637,538, filed on Dec. 20, 2004, provisional application No. 60/652,765, filed on Feb. 14, 2005.

(51) Int. Cl.
*G06G 21/00* (2006.01)
(52) U.S. Cl. .......... 713/155; 713/182; 713/186
(58) Field of Classification Search ........... 380/23; 713/155, 159, 176, 186; 726/27–30; 382/115; 340/5.52–5.53
See application file for complete search history.

(56) References Cited

U.S. PATENT DOCUMENTS

| 4,759,060 A | 7/1988 | Hayashi et al. |
| 4,993,068 A | 2/1991 | Piosenka et al. |
| 5,187,352 A | 2/1993 | Blair et al. |
| 5,296,641 A | 3/1994 | Stelzel |
| 5,392,433 A | 2/1995 | Hammersley et al. |
| 5,416,780 A | 5/1995 | Patel |
| 5,422,632 A | 6/1995 | Bucholtz et al. |
| 5,450,489 A | 9/1995 | Ostrover et al. |
| 5,619,251 A | 4/1997 | Kuroiwa et al. |
| 5,629,980 A | 5/1997 | Stefik et al. |
| 5,644,354 A | 7/1997 | Thompson et al. |
| 5,666,412 A | 9/1997 | Handelman et al. |

(Continued)

FOREIGN PATENT DOCUMENTS

WO    WO 00/62505 A1    10/2000

(Continued)

OTHER PUBLICATIONS

"Alliance Activities: Publications: Identity—Smart Card Alliance," Smart Card Alliance, 1997-2007, [online] [Retrieved on Jan. 7, 2007] Retrieved from the Internet<URL:http://www.smartcardalliance.org/pages/publications-identity>.

(Continued)

*Primary Examiner* — Matthew Smithers
*Assistant Examiner* — Phy Anh Vu
(74) *Attorney, Agent, or Firm* — Patent Law Works LLP (57) ABSTRACT

Systems and methods are provided for an integrated device that persistently (or permanently) stores biometric data for a user in a tamper-resistant format. Subsequently, scan data collected from a user (e.g., a finger-print) can be compared against the biometric data. Once the user has been verified by the integrated device, a code can be wirelessly transmitted for authentication. The authentication module sends the code to a trusted key authority. The trusted key authority checks a list of enrolled integrated devices for a match. If there is a match, the authentication module sends a message to an application to allow access by the user. The trusted key authority also stores a profile associated with the code. The profile can contain user information such as name, age, account numbers, preferences, etc. and can also describe the status of the integrated device.

17 Claims, 6 Drawing Sheets

U.S. PATENT DOCUMENTS

| | | | |
|---|---|---|---|
| 5,784,464 A | 7/1998 | Akiyama et al. | |
| 5,825,876 A | 10/1998 | Peterson, Jr. | |
| 5,857,020 A | 1/1999 | Peterson, Jr. | |
| 5,892,825 A | 4/1999 | Mages et al. | |
| 5,894,551 A | 4/1999 | Huggins et al. | |
| 5,898,880 A | 4/1999 | Ryu | |
| 5,917,913 A | 6/1999 | Wang | |
| 5,928,327 A | 7/1999 | Wang et al. | |
| 5,991,399 A | 11/1999 | Graunke et al. | |
| 5,991,749 A | 11/1999 | Morril, Jr. | |
| 6,016,476 A | 1/2000 | Maes et al. | |
| 6,018,739 A | 1/2000 | McCoy et al. | |
| 6,035,038 A | 3/2000 | Campinos et al. | |
| 6,035,329 A | 3/2000 | Mages et al. | |
| 6,038,334 A | 3/2000 | Hamid | |
| 6,041,410 A * | 3/2000 | Hsu et al. | 713/186 |
| 6,042,006 A | 3/2000 | Van Tilburg et al. | |
| 6,055,314 A | 4/2000 | Spies et al. | |
| 6,070,796 A | 6/2000 | Sirbu | |
| 6,088,730 A | 7/2000 | Kato et al. | |
| 6,104,334 A | 8/2000 | Allport | |
| 6,121,544 A | 9/2000 | Petsinger | |
| 6,148,142 A | 11/2000 | Anderson | |
| 6,161,179 A | 12/2000 | Seidel | |
| 6,185,316 B1 | 2/2001 | Buffam | |
| 6,209,089 B1 | 3/2001 | Selitrennikoff et al. | |
| 6,219,109 B1 | 4/2001 | Raynesford et al. | |
| 6,219,439 B1 | 4/2001 | Burger | |
| 6,247,130 B1 | 6/2001 | Fritsch | |
| 6,256,737 B1 | 7/2001 | Bianco et al. | |
| 6,266,415 B1 | 7/2001 | Campinos et al. | |
| 6,295,057 B1 | 9/2001 | Rosin et al. | |
| 6,336,121 B1 | 1/2002 | Lyson et al. | |
| 6,336,142 B1 | 1/2002 | Kato et al. | |
| 6,363,485 B1 | 3/2002 | Adams et al. | |
| 6,367,019 B1 | 4/2002 | Ansell et al. | |
| 6,381,747 B1 | 4/2002 | Wonfor et al. | |
| 6,385,596 B1 | 5/2002 | Wiser et al. | |
| 6,392,664 B1 | 5/2002 | White et al. | |
| 6,397,387 B1 | 5/2002 | Rosin et al. | |
| 6,401,059 B1 | 6/2002 | Shen et al. | |
| 6,411,307 B1 | 6/2002 | Rosin et al. | |
| 6,424,715 B1 | 7/2002 | Saito | |
| 6,425,084 B1 | 7/2002 | Rallis et al. | |
| 6,434,535 B1 | 8/2002 | Kupka et al. | |
| 6,446,130 B1 | 9/2002 | Grapes | |
| 6,463,534 B1 | 10/2002 | Geiger et al. | |
| 6,480,188 B1 | 11/2002 | Horsley | |
| 6,490,443 B1 | 12/2002 | Freeny, Jr. | |
| 6,510,350 B1 | 1/2003 | Steen et al. | |
| 6,523,113 B1 | 2/2003 | Wehrenberg | |
| 6,529,949 B1 | 3/2003 | Getsin et al. | |
| 6,546,418 B2 | 4/2003 | Schena et al. | |
| 6,550,011 B1 | 4/2003 | Sims, III | |
| 6,563,805 B1 | 5/2003 | Ma et al. | |
| 6,564,380 B1 | 5/2003 | Murphy | |
| 6,628,302 B2 | 9/2003 | White et al. | |
| 6,632,992 B2 | 10/2003 | Hasegawa | |
| 6,647,417 B1 | 11/2003 | Hunter et al. | |
| 6,667,684 B1 | 12/2003 | Waggamon et al. | |
| 6,683,954 B1 | 1/2004 | Searle | |
| 6,697,944 B1 | 2/2004 | Jones et al. | |
| 6,709,333 B1 | 3/2004 | Bradford et al. | |
| 6,711,464 B1 | 3/2004 | Yap et al. | |
| 6,775,655 B1 | 8/2004 | Peinado et al. | |
| 6,804,825 B1 | 10/2004 | White et al. | |
| 6,806,887 B2 | 10/2004 | Chernock et al. | |
| 6,850,147 B2 | 2/2005 | Prokoski et al. | |
| 6,873,975 B1 | 3/2005 | Hatakeyama et al. | |
| 6,950,941 B1 | 9/2005 | Lee et al. | |
| 6,973,576 B2 | 12/2005 | Giobbi | |
| 6,975,202 B1 | 12/2005 | Rodriguez et al. | |
| 6,983,882 B2 | 1/2006 | Cassone | |
| 7,012,503 B2 | 3/2006 | Nielsen | |
| 7,090,126 B2 | 8/2006 | Kelly et al. | |
| 7,112,138 B2 | 9/2006 | Hedrick et al. | |
| 7,137,012 B1 | 11/2006 | Kamibayashi et al. | |
| 7,191,466 B1 | 3/2007 | Hamid et al. | |
| 7,218,944 B2 | 5/2007 | Cromer et al. | |
| 7,249,177 B1 | 7/2007 | Miller | |
| 7,305,560 B2 | 12/2007 | Giobbi | |
| 7,529,944 B2 | 5/2009 | Hamid | |
| 7,574,734 B2 | 8/2009 | Fedronic et al. | |
| 7,644,443 B2 | 1/2010 | Matsuyama et al. | |
| 7,715,593 B1 | 5/2010 | Adams et al. | |
| 7,883,417 B2 | 2/2011 | Bruzzese et al. | |
| 2001/0044337 A1 | 11/2001 | Rowe et al. | |
| 2002/0007456 A1 | 1/2002 | Peinado et al. | |
| 2002/0013772 A1 | 1/2002 | Peinado | |
| 2002/0014954 A1 | 2/2002 | Fitzgibbon et al. | |
| 2002/0015494 A1 | 2/2002 | Nagai et al. | |
| 2002/0023032 A1 | 2/2002 | Pearson et al. | |
| 2002/0026424 A1 | 2/2002 | Akashi | |
| 2002/0073042 A1 | 6/2002 | Maritzen et al. | |
| 2002/0098888 A1 | 7/2002 | Rowe et al. | |
| 2002/0103027 A1 | 8/2002 | Rowe et al. | |
| 2002/0104006 A1 | 8/2002 | Boate et al. | |
| 2002/0109580 A1 | 8/2002 | Shreve et al. | |
| 2002/1010804 | 8/2002 | Xu et al. | |
| 2002/0138767 A1 | 9/2002 | Hamid et al. | |
| 2002/0140542 A1 | 10/2002 | Prokoski et al. | |
| 2002/0144117 A1 | 10/2002 | Faigle | |
| 2002/0150282 A1 * | 10/2002 | Kinsella | 382/124 |
| 2002/0158750 A1 | 10/2002 | Almalik | |
| 2002/0178063 A1 | 11/2002 | Gravelle et al. | |
| 2002/0191816 A1 | 12/2002 | Maritzen et al. | |
| 2003/0036425 A1 | 2/2003 | Kaminkow et al. | |
| 2003/0046552 A1 | 3/2003 | Hamid | |
| 2003/0054868 A1 | 3/2003 | Paulsen et al. | |
| 2003/0054881 A1 | 3/2003 | Hedrick et al. | |
| 2003/0055689 A1 | 3/2003 | Block et al. | |
| 2003/0079133 A1 | 4/2003 | Breiter et al. | |
| 2003/0127511 A1 | 7/2003 | Kelly et al. | |
| 2003/0139190 A1 | 7/2003 | Steelberg et al. | |
| 2003/0172037 A1 | 9/2003 | Jung et al. | |
| 2003/0176218 A1 | 9/2003 | LeMay et al. | |
| 2003/0186739 A1 | 10/2003 | Paulsen et al. | |
| 2004/0127277 A1 | 7/2004 | Walker et al. | |
| 2004/0129787 A1* | 7/2004 | Saito et al. | 235/492 |
| 2004/0209690 A1 | 10/2004 | Bruzzese et al. | |
| 2004/0209692 A1 | 10/2004 | Schober et al. | |
| 2004/0215615 A1 | 10/2004 | Larsson et al. | |
| 2004/0230488 A1* | 11/2004 | Beenau | 705/18 |
| 2005/0074126 A1* | 4/2005 | Stanko | 380/279 |
| 2005/0229007 A1 | 10/2005 | Bolle et al. | |
| 2005/0251688 A1 | 11/2005 | Nanavati et al. | |
| 2006/0022046 A1 | 2/2006 | Iwamura | |
| 2007/0220272 A1* | 9/2007 | Campisi et al. | 713/186 |
| 2008/0188308 A1 | 8/2008 | Shepherd et al. | |
| 2009/0328182 A1 | 12/2009 | Malakapalli et al. | |
| 2010/0117794 A1 | 5/2010 | Adams | |
| 2011/0126188 A1 | 5/2011 | Bernstein et al. | |

FOREIGN PATENT DOCUMENTS

| | | |
|---|---|---|
| WO | WO 01/22724 A1 | 3/2001 |
| WO | WO 01/75876 A1 | 10/2001 |
| WO | WO 01/77790 A1 | 10/2001 |
| WO | WO 2005/050450 A1 | 6/2005 |
| WO | WO 2005/086802 A2 | 9/2005 |

OTHER PUBLICATIONS

"Applying Biometrics to Door Access," Security Magazine, Sep. 26, 2002 [online] [Retrieved on Jan. 7, 2007] Retrieved from the Internet<URL:http://www.securitymagazine.com/CDA/Articles/Technologies/3ae610eaa34d8010VgnVCM100000f932a8c0_>.

"Frequently Asked Questions (FAQs) About BioPay," BioPay, LLC, 2007, [online] [Retrieved on Jan. 7, 2007] Retrieved from the Internet<URL:http://www.biopay.com/faqs-lowes.asp>.

Mciver, R. et al., "Identification and Verification Working Together," Bioscrypt™, Aug. 27, 2004, [online] [Retrieved on Jan. 7, 2007] Retrieved from the Internet <URL:http://www.ibia.org/membersadmin/whitepapers/pdf/15/Identification%20and%20Verification%20Working%20Together.pdf>.

Nilsson, J. et al., "Match-On-Card for Java Cards," Precise Biometrics, White Paper, Apr. 2004, [online] [Retrieved on Jan. 7, 2007] Retrieved from the Internet<URL:http://www.ibia.org/membersadmin/whitepapers/pdf/17/Precise%20Match-on-Card%20for%20Java%20Cards.pdf>.
Nordin, B., "Match-On-Card Technology," Precise™ Biometrics, White Paper, Apr. 2004, [online] [Retrieved on Jan. 7, 2007] Retrieved from the Internet<URL:http://www.ibia.org/membersadmin/whitepapers/pdf/17/Precise%20Match-on-Card%20technology.pdf>.
"SAFModule™: A Look Into Strong Authentication," saflink Corporation, [online] [Retrieved on Jan. 7, 2007] Retrieved from the Internet<URL:http://www.ibia.org/membersadmin/whitepapers/pdf/6/SAFmod_WP.pdf>.
"Smart Cards and Biometrics White Paper," Smart Card Alliance, May 2002, [online] [Retrieved on Jan. 7, 2007] Retrieved from the Internet<URL:http://www.securitymanagement.com/library/smartcard_faqtech0802.pdf>.
Wade, W., "Using Fingerprints to Make Payments at POS Slowly Gaining Popularity," Credit Union Journal, International Biometric Group, Apr. 21, 2003, [online] [Retrieved on Jan. 7, 2007] Retrieved from the Internet<URL:http://www.biometricgroup.com/in_the_news/04.21.03.html>.
Antonoff, Michael, "Visiting Video Valley," Sound & Vision, pp. 116 and 118-119, Nov. 2001.
Article, "In the Age of Napster, Protecting Copyright is a Digital Arms Race," Wall Street Journal, Jul. 25, 2000.
Article, "Sound Waves Could Help Ease Web-Fraud Woes," Wall Street Journal, Aug. 14, 2000.
Blum, Jonathan, "Digital Rights Management May Solver the Napster "Problem"," Technology Investor Industrysector, (Oct. 2000), 24-27.
Debow, Credit/Debit Debuts in Midwest Smart Card Test, Computers in Banking, v6, n11, p10, Nov. 1989.
Dennis, Digital Passports Need Not Infringe Civil Liberties, Newsbytes, Dec. 2, 1999, 2 pages.
Fasca, Chad, "The Circuit," Electronic News, 45(45) (Nov. 8, 1999), 20.
Firecrest Shows How Truly Commercially-Minded Companies Will Exploit the Internet, Computergram International, Jan. 18, 1996.
Lake, Matt, "Downloading for Dollars," Sound & Vision, (Nov. 2000), 137-138.
Lewis, Sony and Visa in On-Line Entertainment Venture, New York Times, v145, Nov. 16, 1995.
Notification of the International Search Report and Written Opinion, PCT/US04/38124, Apr. 7, 2005, 10 pages.
Paget, Paul, "The Security Behind Secure Extranets," Enterprise Systems Journal, (Dec. 1999), 4 pgs.
Press Release, "Micronas and Thomson Multimedia Showcase a New Copy Protection System that Will Drive the Future of Digital Television," www.micronas.com, Jan. 8, 2002.
Press Release, "Content Protection Plan Targets Wireless Home Networks," www.eetimes.com, Jan. 11, 2002.
Press Release, "Thompson Bets on Smart Cards for Video Encryption," www.informationweek.com, Jun. 7, 2001.
Press Release, "Thompson Multimedia Unveils Copy Protection Proposal Designed to Provide Additional Layer of Digital Content Security," www.thompson-multimedia.com, May 30, 2001.
"Say Hello to Bluetooth," Bluetooth Web site, 4 pages.
Sapsford, Jathon, "E-Business: Sound Waves Could Help Ease Web-Fraud Woes," Wall Street Journal, (Aug. 14, 2000), B1.
Van Winkle, William, "Bluetooth, the King of Connectivity," Laptop Buyer's Guide and Handbook, (Jan. 2000), 148-153.
Wallace, Bob, "The Internet Unplugged," InformationWeek, 765(22), (Dec. 13, 1999), 22-24.
Weber, Thomas E., "In the Age of Napster, Protecting Copyright is a Digital Arms Race," Wall Street Journal, (Jul. 24, 2000), B1.
PCT International Search Report and Written Opinion, PCT/US05/43447, Feb. 22, 2007, 7 pages.
PCT International Search Report and Written Opinion, PCT/US05/46843, Mar. 1, 2007, 10 pages.
Non-Final Office Action, U.S. Appl. No. 11/292,330, Dated: Sep. 16, 2010, 23 pages.
United States Office Action, U.S. Appl. No. 11,744,831, Sep. 3, 2010, 27 pages.
International Search Report, PCT/U507/11103, Apr. 23, 2008, 9 pages.
International Search Report, PCT/US07/11104, Jun. 26, 2008, 9 pages.
International Search Report, PCT/US07/11102, Oct. 3, 2008, 11 pages.
International Search Report, PCT/US07/11105, Oct. 20, 2008, 10 pages.
"What is a File?", Apr. 30, 1998, URL: http://unixhelp.ed.ac.uk/editors/whatisafile.html, accessed Mar. 11, 2010 via http://waybackmachine.org/1 9980615000000* /http://unixhelp.ed.ac.uk/editors/whatisafile.html.
United States Office Action, U.S. Appl. No. 11/292,330, Dec. 2, 2011, 25 pages.
United States Office Action, U.S. Appl. No. 11/744,831, Dec. 16, 2011, 38 pages.
United States Office Action, U.S. Appl. No. 11/744,832, Feb. 7, 2012, 32 pages.
United States Office Action, U.S. Appl. No. 11/745,249, Feb. 2, 2012, 36 pages.
United States Office Action, U.S. Appl. No. 11/292,330, Apr. 6, 2012, 22 pages.
Pope, Oasis Digital Signature Services: Digital Signing without the Headaches, Internet Computing-IEEE, vol. 10, 2006, pp. 81-84.

* cited by examiner

BIOMETRIC PERSONAL DATA KEY (PDK) AUTHENTICATION

CROSS-REFERENCE TO RELATED APPLICATIONS

The present application claims the benefit of U.S. Provisional Application No. 60/637,538, filed on Dec. 20, 2004, and of U.S. Provisional Application No. 60/652,765, filed on Feb. 14, 2005, the entire contents of both applications being herein incorporated by reference.

FIELD OF THE INVENTION

The present invention relates generally to computerized authentication, and more specifically, to an authentication responsive to biometric verification of a user being authenticated.

BACKGROUND

Conventional user authentication techniques are designed to prevent access by unauthorized users. One technique is to require a user being authenticated to provide secret credentials, such as a password, before allowing access. Similarly, a PIN number can be required by an ATM machine before allowing a person to perform automated bank transactions. A difficulty with this technique is that it requires the user to memorize or otherwise keep track of the credentials. A user often has multiple sets of credentials (e.g., passwords and PINs) and it can be quite difficult to keep track of them all.

Another technique that does not require the user to memorize credentials is to provide the user with an access object such as a key (e.g., an electronic key) that the user can present to obtain access. For example, a user can be provided with a small electronic key fob that allows access to a building or other secured location. A difficulty with using access objects is that authentication merely proves that the access object itself is valid; it does not verify that the legitimate user is using the access object. That is, illegitimate user can use a stolen access object to enter a secured location because the user's identity is never checked.

Some hybrid authentication techniques require the user to provide both an access object and credentials. The user is authenticated only upon providing both items. Of course, this solution does not resolve the problem of making the user memorize credentials.

Therefore, there is a need for systems and methods for verifying a user that is being authenticated that does not suffer from the limitations described above. Moreover, the solution should ease authentications by wirelessly providing an identification of the user.

SUMMARY

The present invention addresses the above needs by providing systems and methods for authentication responsive to biometric verification of a user being authenticated. In one embodiment, a biometric key persistently (or permanently) stores a code such as a device identifier (ID) and biometric data for a user in a tamper-resistant format. Subsequently, scan data collected from a user (e.g., a fingerprint or retinal scan) can be compared against the biometric data. Once the user has been verified by the integrated device, the code can be wirelessly transmitted to indicate that the user has been successfully verified.

In one embodiment, an authentication module sends the code to a trusted key authority. The trusted key authority checks a list of enrolled biometric keys to determine whether the code is valid. If the code is valid, the authentication module allows the user to access an application.

In another embodiment, the trusted key authority can store a profile associated with the biometric key having the code. The profile can contain user information such as name, age, account numbers, preferences, and the like. In addition, the profile can describe the status of the key, identify the trusted key authority, and/or contain other information. The profile can also be sent to the authentication module for use by the application (e.g., an age of user sent to a casino machine).

Advantageously, user authentication is bolstered with highly reliable biometric verification of the user in a single key. Furthermore, a keyless environment relieves authorized users from having to memorize credentials, and of having to physically enter credentials or keys. In addition, the key can be authenticated for an application that is open to the public (i.e., in an open loop system).

The features and advantages described in the specification are not all inclusive and, in particular, many additional features and advantages will be apparent to one of ordinary skill in the art in view of the drawings, specifications, and claims. Moreover, it should be noted that the language used in the specification has been principally selected for readability and instructional purposes and may not have been selected to delineate or circumscribe the inventive matter.

BRIEF DESCRIPTION OF THE DRAWINGS

The teachings of the present invention can be readily understood by considering the following detailed description in conjunction with the accompanying drawings.

DETAILED DESCRIPTION

Systems and methods for authentication responsive to biometric verification of a user being authenticated are described. Generally, biometric verification uses biometric data to ensure that the user of, for example, a biometric key, is the person registered as an owner. Biometric data is a digital or analog representation of characteristics unique to the user's body. For example, a finger-print of a subject can be compared against previously-recorded biometric data for verification that the subject is the registered owner of the biometric key. Then, the biometric key itself can be authenticated.

Although the embodiments below are described using the example of biometric verification using a fingerprint, other embodiments within the spirit of the present invention can perform biometric verification using other types of biometric data. For example, the biometric data can include a palm print, a retinal scan, an iris scan, hand geometry recognition, facial recognition, signature recognition, or voice recognition.

Figure 1:
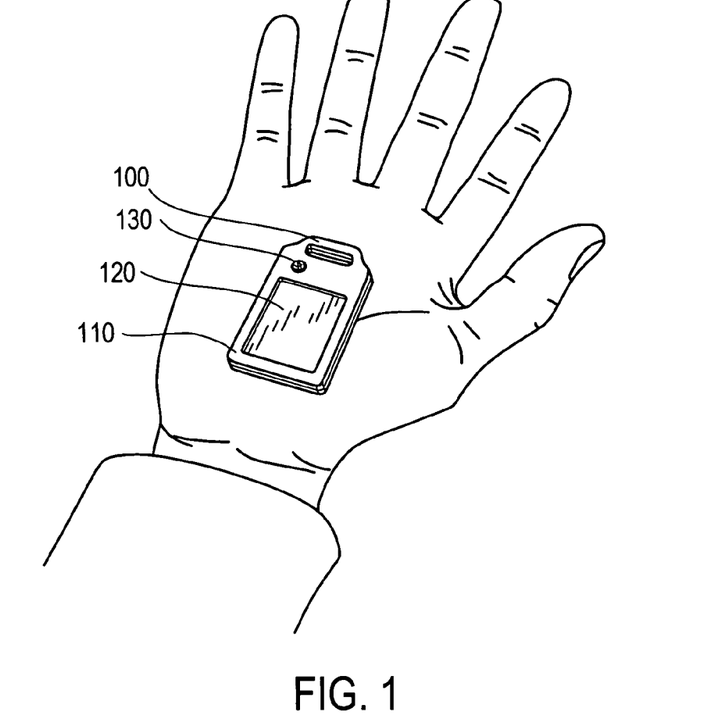
FIG. 1 is a schematic diagram illustrating a biometric key for providing authentication information for a biometrically verified user according to one embodiment of the present invention.

FIG. 1 is a schematic diagram illustrating an example of a biometric key 100 for providing authentication information for a biometrically verified user according to one embodiment of the present invention. Biometric key 100 comprise a frame 110, a scan pad 120, and an LED 130. In one embodiment, biometric key 100 has a small form factor (e.g., the size of a automobile remote control) such that it can be unobtrusively carried by a user.

Frame 110 can be formed by plastic, metal or another suitable material. Frame 110 is shaped to secure scan pad 120, and includes a perforation for attachment to, for example a key chain or clip. In one embodiment, frame 110 is formed from a unitary molding to protect biometric data. Accordingly, frame 110 cannot be opened to expose the underlying components unless it is broken.

Scan pad 120 can be, for example, an optical scanner using a charge coupled device, or a capacitive scanner. Scan pad 120 can be sized to fit a thumb or other finger. Biometric key 100 of the present embodiment includes LED 130 that lights up to request a fingerprint scan from a user. In one embodiment, LED 130 can also confirm that user verification and/or authentication has completed.

Biometric key 100 can authenticate a user for various purposes. For example, biometric key 100 can allow keyless entry into homes and autos. In another example, biometric key 100 can log a user onto a computer system or point of sale register without typing in credentials. In still another example, biometric key 100 can verify that an enrolled user is above a certain age (e.g., before allowing access to a slot machine in a casino). In some embodiments, biometric key 100 operates without biometric verification, and request a fingerprint scan from a user only when biometric verification is needed for the particular use.

Figure 2:
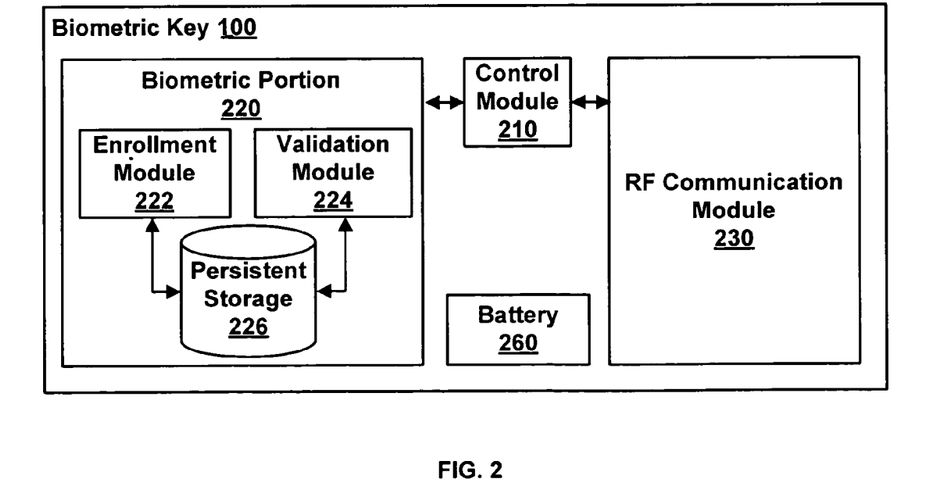
FIG. 2 is a block diagram illustrating functional modules within the biometric key according to one embodiment of the present invention.

FIG. 2 is a block diagram illustrating biometric key 100 according to one embodiment of the present invention. Biometric key 100 comprises control module 210, biometric portion 220, RF communication module 230, persistent storage 226, and battery 250. Biometric key 100 can be formed from a combination of hardware and software components as described above. In one embodiment, biometric key 100 comprises a modified key fob.

Control module 210 coordinates between several functions of biometric key 100. In one embodiment, control module 210 provides a verification code upon successful verification of the user. More specifically, once biometric portion 220 indicates that a fingerprint scan matches biometric data that was collected during enrollment, control module 210 can trigger RF communication module 230 for sending a code indicating that the user was verified. In another embodiment, control module 210 can work in the opposite direction by detecting a request for verification from RF communication module 230, and then requesting verification of the user from biometric portion 220. Note that control module 210 of FIG. 2 is merely a grouping of control functions in a central architecture, and in other embodiments, the control functions can be distributed between several modules around biometric key 100.

Biometric portion 220 comprises enrollment module 222, validation module 224, and biometric data base 226. In one embodiment, enrollment module 222 registers a user with biometric key 100 by persistently storing biometric data associated with the user. Further, enrollment module 222 registers biometric key 100 with a trusted authority by providing the code (e.g., device ID) to the trusted authority. Or conversely, the trusted authority can provide the code to biometric key 100 to be stored therein.

Validation module 224 can comprise scan pad 120 (FIG. 1) to capture scan data from a user's fingerprint (e.g., a digital or analog representation of the fingerprint). Using the scan data, validation module 224 determines whether the user's fingerprint matches the stored biometric data from enrollment. Conventional techniques for comparing fingerprints can be used. For example, the unique pattern of ridges and valleys of the fingerprints can be compared. A statistical model can be used to determine comparison results. Validation module 224 can send comparison results to control module 210.

In other embodiments, validation module 224 can be configured to capture biometric data for other human characteristics. For example, a digital image of a retina, iris, and/or handwriting sample can be captured. In another example, a microphone can capture a voice sample.

Persistent storage 226 persistently stores biometric data from one or more users which can be provided according to specific implementations. In one embodiment, at least some of persistent storage 226 is a memory element that can be written to once but cannot subsequently be altered. Persistent storage 226 can include, for example, a ROM element, a flash memory element, or any other type of non-volatile storage element. Persistent storage 226 is itself, and stores data in, a tamper-proof format to prevent any changes to the stored data. Tamper-proofing increases reliability of authentication because it does not allow any changes to biometric data (i.e., allows reads of stored data, but not writes to store new data or modify existing data). Furthermore, data can be stored in an encrypted form.

In one embodiment, persistent storage 226 also stores the code that is provided by the key 100 responsive to successful verification of the user. As described above, in one embodiment the code is a device ID or other value that uniquely identifies biometric key 100. In one embodiment, the code is providing during the manufacturing process and the biometric data are provided during an enrollment of the user. In other embodiments, the code is provided during enrollment and/or the biometric data are provided during manufacturing. Further, in some embodiments persistent storage 226 stores other data utilized during the operation of biometric key 100. For example, persistent storage 226 can store encryption/decryption keys utilized to establish secure communications links.

Radio frequency (RF) communication module 230 is, for example, a transceiver or other mechanism for wireless communication. RF communication module 230 can send and receive data (e.g., the code) as modulated electromagnetic signals. In one embodiment, RF communication 230 can be optimized for low-power usage by, for example, using short-range transceivers. RF communication module 230 can actively send out connection requests, or passively detect connection requests.

Battery 260 can be a conventional power source suitable for the components of biometric key 100. Battery 260 can be either replaceable or rechargeable. Alternatively, battery 260 can be embedded within key 100 such that the key must be discarded or recycled upon expiration of the battery.

Figure 3:
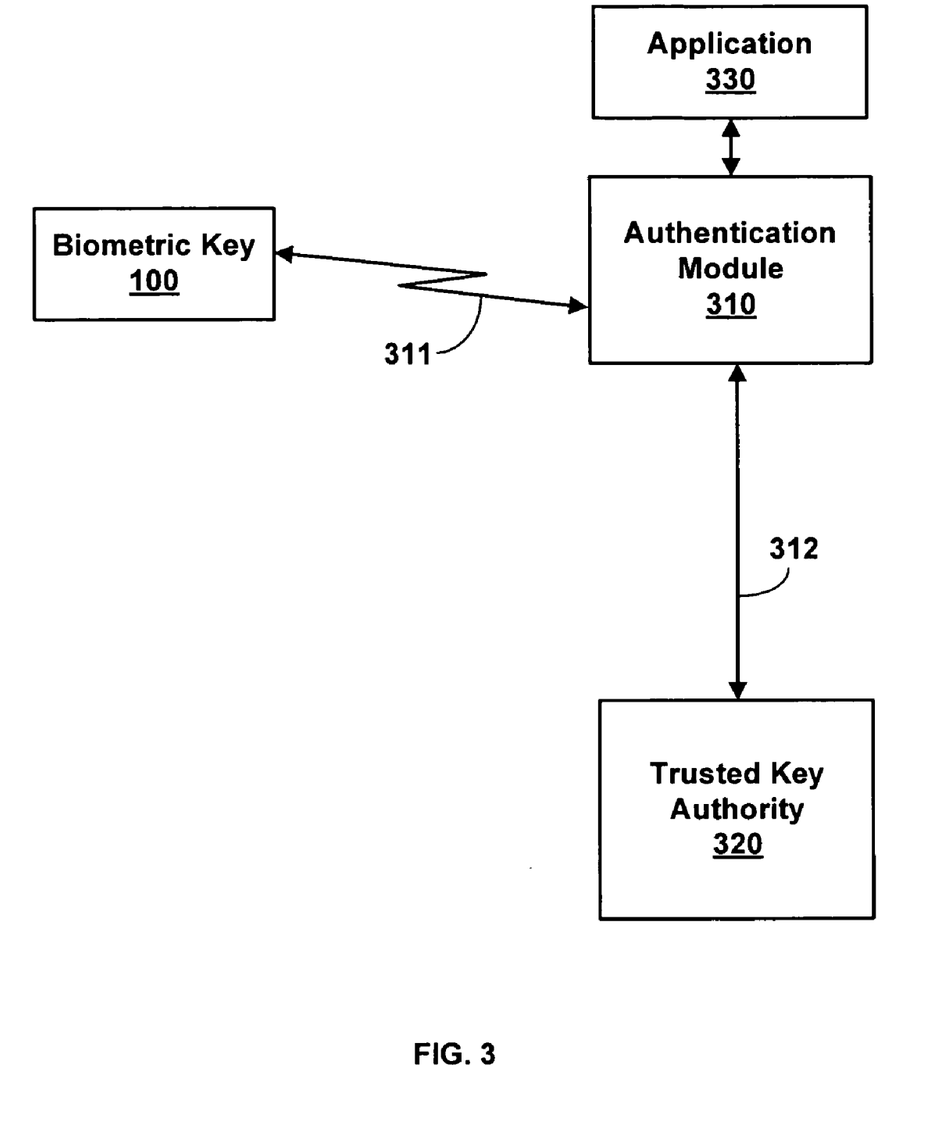
FIG. 3 is a block diagram illustrating a system for providing authentication information for a biometrically verified user.

FIG. 3 is a block diagram illustrating a system 300 for providing authentication information for a biometrically verified user. System 300 comprises an authentication module 310 in communication with biometric key 100, a trusted key authority 320, and an application 330.

Authentication module 310 is coupled in communication with biometric key via line 311 (i.e., a wireless medium such as EM signals), and with trusted key authority 320 via line 312 (e.g., a secure data network such as the Internet, or a cell network). Authentication module 310 can include one or more of, for example, a computerized device, software executing on a computerized device, and/or a reader/decoder circuit. In one embodiment, authentication module 310 serves as a gatekeeper to application 330 by requiring the code indicating successful biometric verification of the user prior to allowing access to the application. Further, in one embodiment, authentication module 310 provides the code to trusted key authority 320 in order to verify that it belongs to a legitimate key (e.g., when application 330 is security-critical). Authentication module 310 can send a message to application 330, or otherwise allow access to the application, responsive to a successful authentication by trusted key authority 320.

Application 330 is a resource that can be accessed by a verified and authenticated user. Application 330 can be, for example, a casino machine, a keyless lock, a garage door opener, an ATM machine, a hard drive, computer software, a web site, a file, and the like. Application 330 can execute on the same system as authentication module 310 or on another system in communication with the system of the authentication module. In one embodiment, application module 330 allows access by a user after receiving a message from authentication module 310. At that point, application 330 can allow direct use by the user, or require that communications continue to pass through authentication module 310 for continued authentication.

Trusted key authority 320 is a third-party authority that is present in some embodiments in order to provide enhanced security. In one embodiment, trusted key authority 320 verifies that a code from a biometric key is legitimate. To do so, the trusted key authority 320 stores a list of codes for legitimate biometric keys. The list can be batched or updated each time a new user/key is enrolled. In one embodiment, trusted key authority 320 can also store a profile associated with a biometric key. The profile describes the user associated with the key, the key itself, the trusted key authority, and/or other relevant information. In one embodiment, the functionality of trusted key authority 320 is provided by a server or other computerized device.

In an open system, where unknown users can attempt authentication (e.g., in a public grocery store), trusted key authority 320 provides verification that a key presenting a certain code is legitimate. By contrast, in a closed system, only known users are legitimate (e.g., owners of a home), the trusted key authority 320 can be maintained locally and serves to verify that the key belongs to one of the limited number of users that can use the system.

Figure 4:
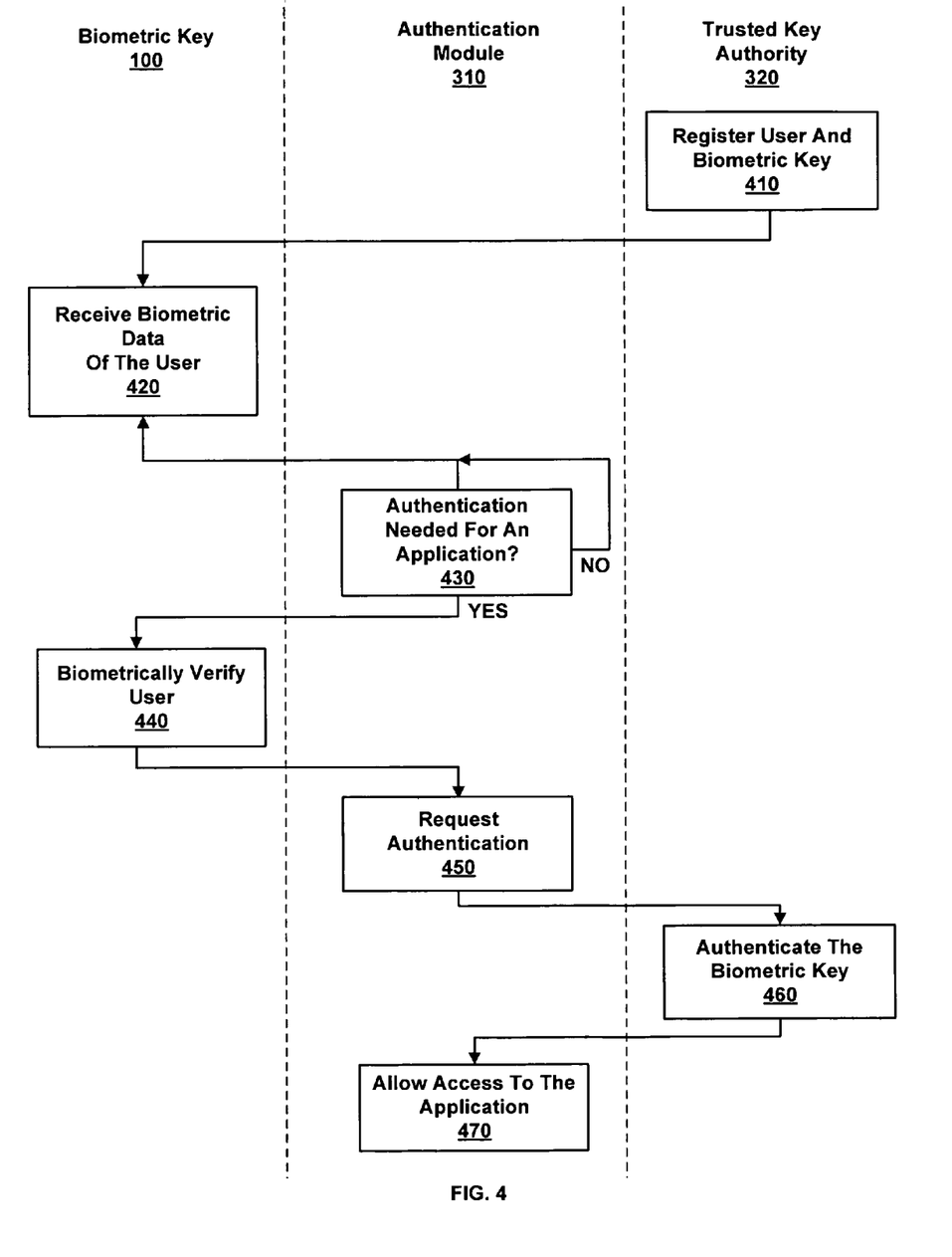
FIG. 4 is a flow chart illustrating a method for providing authentication information for a biometrically verified user.

FIG. 4 is a flow chart illustrating a method 400 for authenticating a biometrically verified user using a trusted key authority (e.g., authority 320). A biometric key (e.g., biometric key 100) is registered 410 with the trusted key authority. The code (e.g., device ID) of the key is stored by the trusted key authority. Additionally, a user is enrolled 420 with the biometric key as described below with reference to FIG. 5.

In various situations, authentication of the key is needed 430 (e.g., by authentication module 310). In one embodiment, authentication can be required prior to allowing access to an application (e.g., application 330). For example, a user can be standing proximate to a slot machine in a casino which requires that a user be over the age of 21. The slot machine can detect the biometric key in the user's pocket, and, in response, spawn a conspicuous pop-up window on the slot machine requesting age verification. Alternatively, the biometric key can blink an LED. In other embodiments, biometric verification is not necessary and only the key itself is authenticated.

The biometric key establishes communication with the authentication module using various techniques. In one embodiment, the key and authentication module engage in preliminary data exchanges to determine who and/or what they are (e.g., to ascertain that they belong to the same system). These data exchanges can include challenge-response dialogs, hashing algorithms, and the like in order to ensure that the biometric key and authentication module are themselves legitimate. Further, in one embodiment the key and authentication module establish a secure communications channel. The key performs the biometric verification of the user 440 as described below with reference to FIG. 6. If the biometric verification of the user is successful, the key provides its code over the secure communications channel.

The code is utilized to authenticate the biometric key itself 450, 460 as described below with reference to FIG. 7 and profile information is received. Responsive to successful authentication of the key, access is allowed 470 to the application. In the slot machine example, a new pop-up window can be spawned to indicate a successful age verification.

Figure 5:
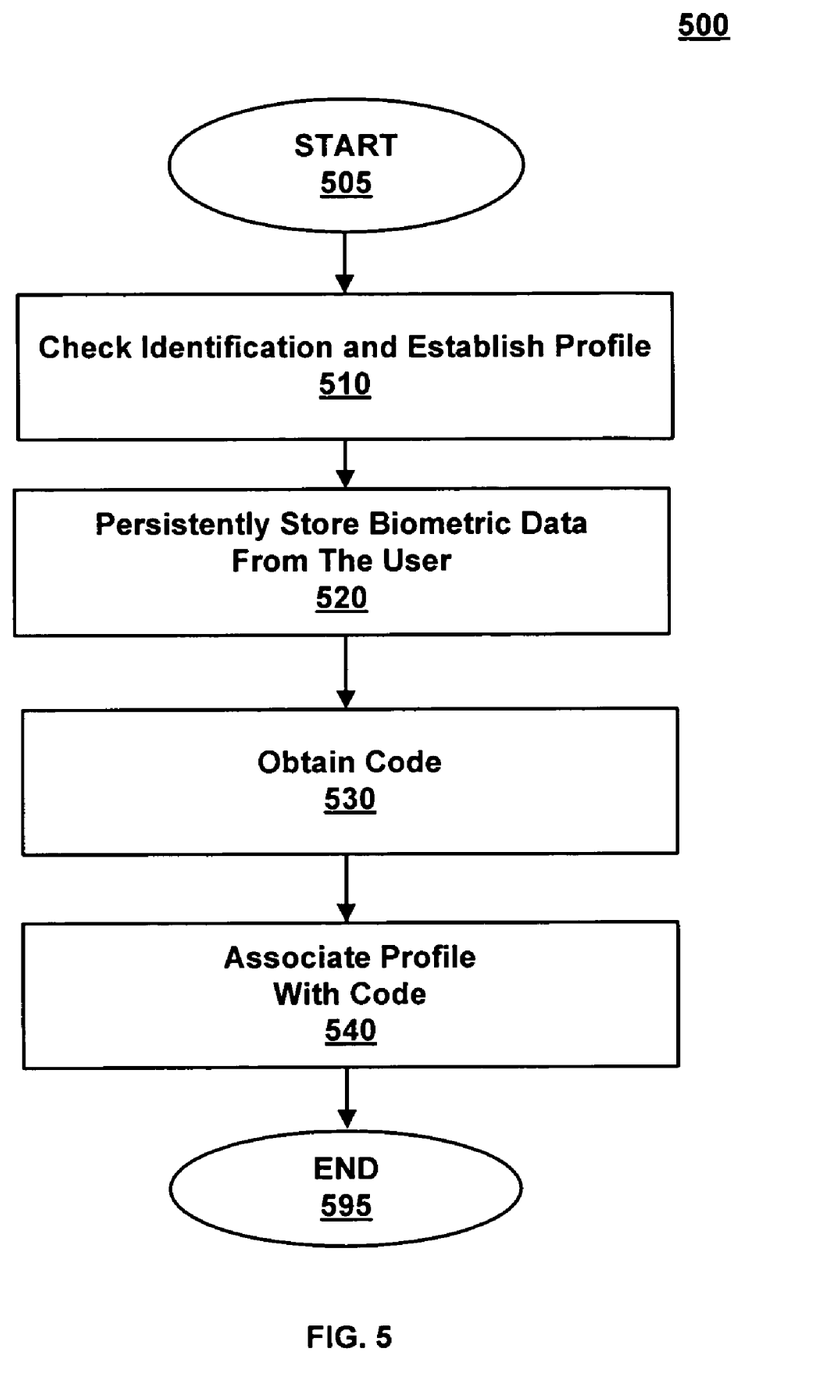
FIG. 5 is a flow chart illustrating a method for enrolling biometric data of the user with the biometric key.

FIG. 5 is a flow chart illustrating a method 500 for enrolling biometric data of the user with the biometric key according to one embodiment of the present invention. An agent checks 510 an identification of the user and establishes a profile. The agent can be, for example, a government official, a notary, and/or an employee of a third party which operates the trusted key authority, or another form of witness. The agent can follow standardized procedures such as requiring identification based on a state issued driver license, or a federally issued passport in order to establish a true identity of the user.

The profile describes the user and can include, for example, the user's name, date of birth, age, passwords, account numbers, preferences etc. In some embodiments, the profile stores no or only limited information about the user. For example, the agent might store the date of birth of the user in the profile, but not store any other information about the user. In addition, the profile describes the biometric key and/or key authority. For the biometric key, the profile can store a value indicating the status of the key, such as whether the key is in-service, out-of-service, abandoned, lost, stolen etc. For the key authority, the profile can store a value identifying the key authority.

The agent also collects and persistently stores 520 biometric data from the user. To do so, a fingerprint or eye retina can be scanned and converted to data which is then persistently stored in the biometric key. In one embodiment, the agent does not retain the biometric data. Since this step occurs under control of the agent, the agent can be certain that the biometric data stored within the key matches the user who presented the identification. The agent also obtains the code (e.g., device ID) from the biometric key in which the biometric data was stored. The agent associates the code and the profile using a table and/or other data structure.

Figure 6:
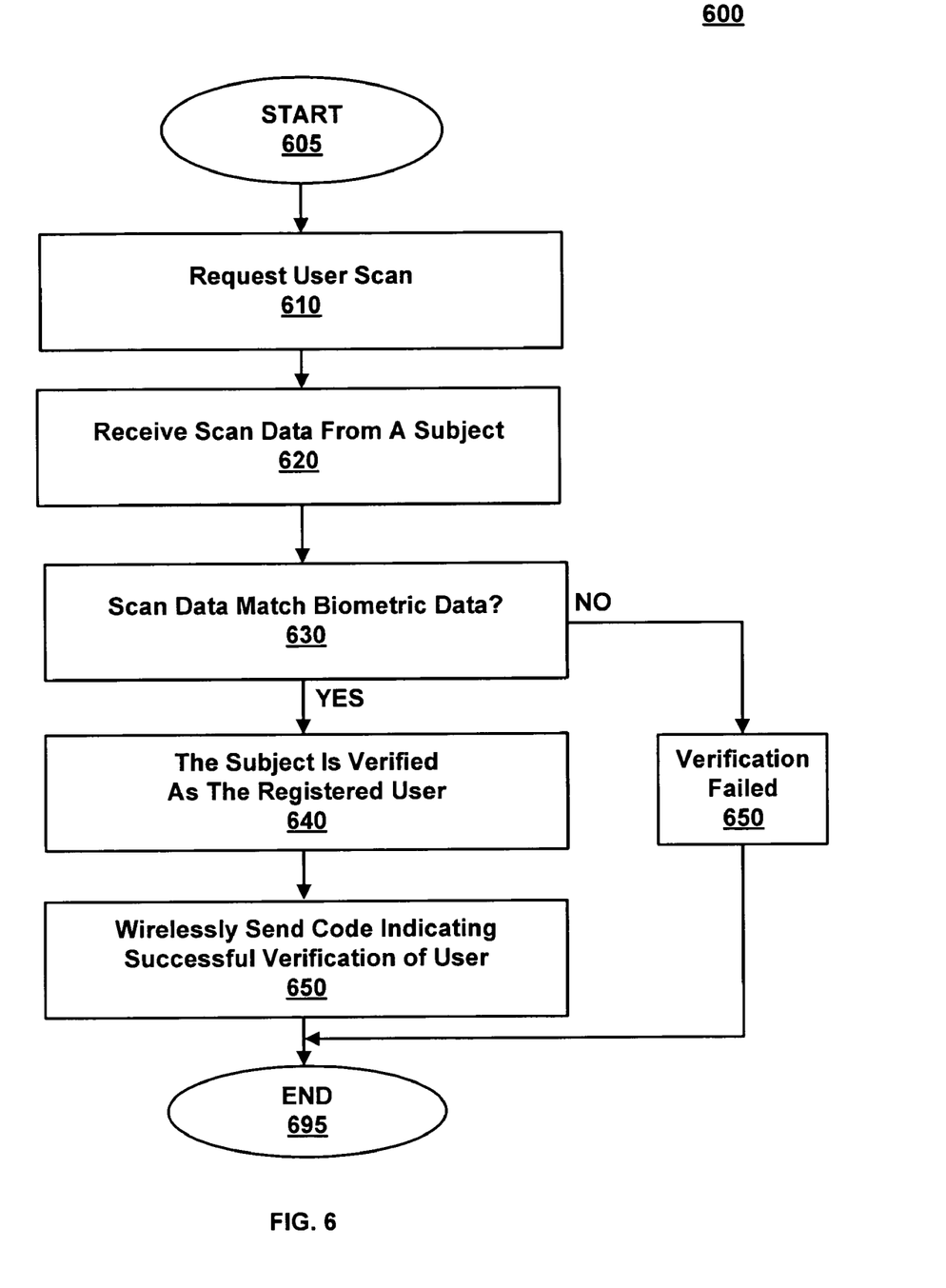
FIG. 6 is a flow chart illustrating a method for verifying a subject presenting the biometric key according to one embodiment of the present invention.

FIG. 6 is a flow chart illustrating a method 600 for verifying a subject presenting the biometric key according to one embodiment of the present invention. In response to an authentication request, a user scan is requested 610 (e.g., by a blinking LED). Once the subject provides a fingerprint, scan data is received 620. Scan data is compared for a match 630 to previously-stored biometric data. If there is no match, then verification fails 650.

If there is a match, the subject is verified 640 as the user. The code indicating a successful verification is wirelessly sent 650 from the biometric key (e.g., by RF communication module 230).

Figure 7:
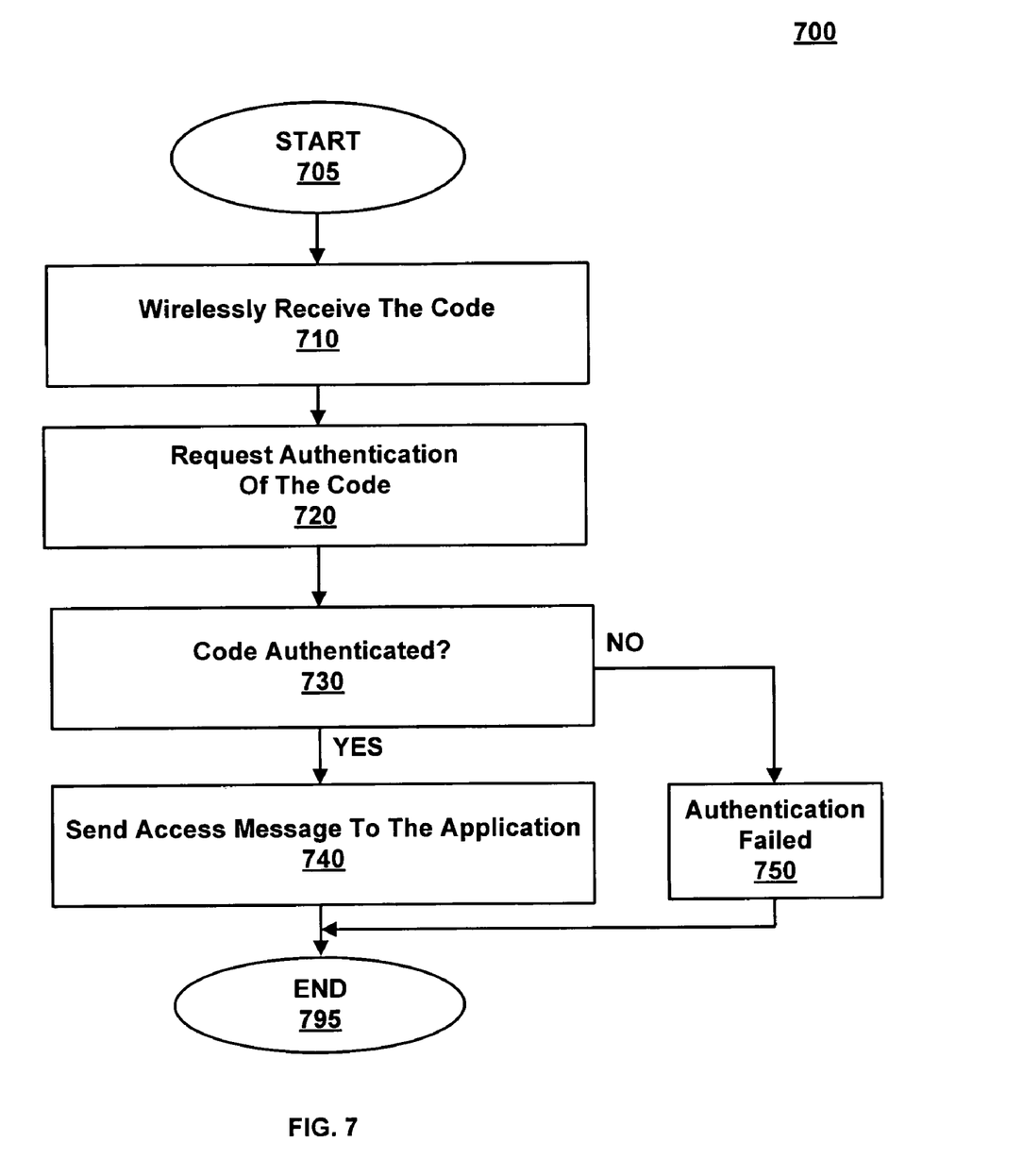
FIG. 7 is a flow chart illustrating a method for authenticating a verified user of the biometric key according to one embodiment of the present invention.

FIG. 7 is a flow chart illustrating a method 700 for authenticating a biometric key according to one embodiment of the present invention. The code is wirelessly received 710. A request for authentication of the code is sent to the trusted key authority 720. The trusted key authority determines whether the code is authentic 730 (i.e., it was created through an established enrollment process) and has a valid status (e.g., has not expired). If authentication is successful, the trusted key authority sends an access message to the application to allow user access and/or provide additional information from the profile 740 (such as the user's age). If authentication is not successful, authentication fails 750 and the message to the application indicates that the user should be denied access.

In some embodiments, the biometric key provides multiple codes and/or other data values. For example, the key can provide a device ID code that the authentication module can provide to the trusted key authority in order to authenticate the key, and the key can provide a secret decryption value that can be used to communicate with the biometric key. As used herein, the term "code" is intended to include one or more of these values, depending upon the specific embodiment.

The order in which the steps of the methods of the present invention are performed is purely illustrative in nature. The steps can be performed in any order or in parallel, unless otherwise indicated by the present disclosure. The methods of the present invention may be performed in hardware, firmware, software, or any combination thereof operating on a single computer or multiple computers of any type. Software embodying the present invention may comprise computer instructions in any form (e.g., source code, object code, interpreted code, etc.) stored in any computer-readable storage medium (e.g., a ROM, a RAM, a magnetic media, a compact disc, a DVD, etc.). Such software may also be in the form of an electrical data signal embodied in a carrier wave propagating on a conductive medium or in the form of light pulses that propagate through an optical fiber.

While particular embodiments of the present invention have been shown and described, it will be apparent to those skilled in the art that changes and modifications may be made without departing from this invention in its broader aspect and, therefore, the appended claims are to encompass within their scope all such changes and modifications, as fall within the true spirit of this invention.

In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus can be specially constructed for the required purposes, or it can comprise a general-purpose computer selectively activated or reconfigured by a computer program stored in the computer. Such a computer program can be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems can be used with programs in accordance with the teachings herein, or it may prove convenient to construct more specialized apparatuses to perform the method steps. The required structure for a variety of these systems will appear from the description below. In addition, the present invention is not described with reference to any particular programming language. It will be appreciated that a variety of programming languages can be used to implement the teachings of the invention as described herein. Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific operating system or environment.

It will be understood by those skilled in the relevant art that the above-described implementations are merely exemplary, and many changes can be made without departing from the true spirit and scope of the present invention. Therefore, it is intended by the appended claims to cover all such changes and modifications that come within the true spirit and scope of this invention.

What is claimed is:

1. A method for verifying a user during authentication of an integrated device, comprising the steps of:
    persistently storing biometric data of the user and a plurality of codes and other data values comprising a device ID code uniquely identifying the integrated device and a secret decryption value in a tamper proof format written to a storage element on the integrated device that is unable to be subsequently altered; wherein the biometric data is selected from a group consisting of a palm print, a retinal scan, an iris scan, a hand geometry, a facial recognition, a signature recognition and a voice recognition;
    responsive to receiving a request for a biometric verification of the user, receiving scan data from a biometric scan;
    comparing the scan data to the biometric data to determine whether the scan data matches the biometric data;
    responsive to a determination that the scan data matches the biometric data, wirelessly sending one or more codes from the plurality of codes and the other data values for authentication by an agent that is a third-party trusted authority possessing a list of device ID codes uniquely identifying legitimate integrated devices, wherein the one or more codes and other data values includes the device ID code; and
    responsive to authentication of the one or more codes and the other data values by the agent, receiving an access message from the agent allowing the user access to an application, wherein the application is selected from a group consisting of a casino machine, a keyless lock, a garage door opener, an ATM machine, a hard drive, computer software, a web site and a file.

2. The method of claim 1, wherein the one or more codes and the other data values are transmitted to the agent over a network.

3. The method of claim 1, further comprising:
    registering an age verification for the user in association with the device ID code.

4. The method of claim 1, wherein the one or more codes and the other data values indicate that the biometric verification was successful.

5. The method of claim 1, wherein the biometric data and the scan data are both based on a fingerprint scan by the user.

6. The method of claim 1, further comprising:
    establishing a secure communication channel prior to sending the one or more codes and the other data values for authentication.

7. The method of claim 1, further comprising:
    receiving a request for the one or more codes and the other data values without a request for biometric verification; and
    responsive to receiving the request for the one or more codes and the other data values without a request for biometric verification, sending the one or more codes and the other data values without requesting the scan data.

8. An integrated device for verifying a user during authentication of the integrated device, comprising:
    a memory stores biometric data of a user and a plurality of codes and other data values comprising a device ID code uniquely identifying the integrated device and a secret decryption value in a tamper proof format written to the memory that is unable to be subsequently altered; wherein the biometric data is selected from a group consisting of a palm print, a retinal scan, an iris scan, a hand geometry, a facial recognition, a signature recognition and a voice recognition;
    a verification unit, in communication with the memory, receives scan data from a biometric scan for comparison against the biometric data, and if the scan data matches the biometric data, wirelessly sends one or more codes from the plurality of codes and the other data values for authentication by an agent that is a third-party trusted authority possessing a list of device ID codes uniquely identifying legitimate integrated devices, wherein the one or more codes and the other data values includes the device ID code; and
    responsive to the agent authenticating the one or more codes and the other data values, a radio frequency communicator, receives an access message from the agent allowing the user access to an application, wherein the application is selected from a group consisting of a casino machine, a keyless lock, a garage door opener, an ATM machine, a hard drive, computer software, a web site and a file.

9. The integrated device of claim 8, wherein the one or more codes and the other data values are transmitted to the agent over a network.

10. The integrated device of claim 9, wherein an age verification is registered in association with the device ID code.

11. The integrated device of claim 8, wherein the verifier comprises: an LED to be activated for requesting the biometric scan.

12. A method for authenticating a verified user using a computer processor configured to execute method steps, comprising:
    receiving one or more codes from a plurality of codes and other data values including a device ID code, wherein the plurality of codes and the other data values comprises the device ID code uniquely identifying the integrated device and a secret decryption value associated with a biometrically verified user, the device ID code being registered with an agent that is a third-party trusted authority possessing a list of device ID codes uniquely identifying legitimate integrated devices;
    requesting authentication of the one or more codes and the other data values by the agent, wherein the authentication determines whether the one or more codes and the other data values are-legitimate;
    receiving an access message from the agent; and
    in response to a positive access message, allowing the biometrically verified user access to an application, wherein the application is selected from a group consisting of a casino machine, a keyless lock, a garage door opener, an ATM machine, a hard drive, computer software, a web site and a file.

13. The method of claim 12, further comprising:
    registering a date of birth or age with the agent.

14. The method of claim 12, further comprising:
    establishing a secure communications channel with a biometric key, wherein the one or more codes and the other data values associated with the biometrically verified user is received from the biometric key.

15. A system, comprising:

a biometric key stores biometric data of a user and a plurality of codes and other data values comprising a device ID code uniquely identifying the biometric key and a secret decryption value in a tamper proof format written to a storage element on the biometric key that is unable to be subsequently altered, and if scan data can be verified as being from the user by comparing the scan data to the biometric data, wirelessly sending, one or more codes from the plurality of codes and other data values wherein the one or more codes and the other data values include the device ID code, and the biometric data is selected from a group consisting of a palm print, a retinal scan, an iris scan, a hand geometry, a facial recognition, a signature recognition and a voice recognition; and an authentication unit receives the plurality of codes and the other data values and send the plurality of codes and the other data values to agent for authentication to determine whether the one or more codes and the other data values are legitimate, wherein the agent is a third-party trusted authority possessing a list of device ID codes uniquely identifying legitimate integrated devices, and responsive to the device ID code being authenticated, the authentication unit receiving an access message from the agent allowing the user to access an application, wherein the application is selected from a group consisting of a casino machine, a keyless lock, a garage door opener, an ATM machine, a hard drive, computer software, a web site and a file.

16. The system of claim 15, wherein the biometric key receives an authentication request from the authentication unit, and in response, requests a biometric scan from the user to generate the scan data.

17. The system of claim 15, wherein if the biometric key cannot verify the scan data as being from the user, it does not send the one or more codes and the other data values.

* * * * *